Patented Oct. 31, 1922.

1,433,732

UNITED STATES PATENT OFFICE.

WARREN K. LEWIS AND ROBERT E. WILSON, OF CAMBRIDGE, MASSACHUSETTS.

PRODUCTION OF FINELY-DIVIDED MATERIALS.

No Drawing. Application filed November 10, 1920. Serial No. 423,174.

*To all whom it may concern:*

Be it known that we, WARREN K. LEWIS and ROBERT E. WILSON, of Cambridge, Massachusetts, citizens of the United States, have invented new and useful Improvements in the Production of Finely-Divided Materials, of which the following is a specification.

This invention relates to the production of materials in very finely divided particles and more especially to the production of clouds or mists.

Artificial smoke clouds or fogs find extensive use in warfare to conceal various movements from the enemy. Such clouds are especially adapted to conceal moving vessels from submarines seeking to attack them and also to conceal preparations for surprise attacks upon the enemy's lines.

Among the objects of this invention is the production of a cloud, mist or fog which will have a high total obscuring power, high density, low rate of settling and great stability. This invention comprises producing a cloud or fog by the interaction of two or more substances in the liquid or gaseous state to form liquid or solid particles diffused through an inert medium. When two or more gaseous substances, capable of reacting to form a liquid or a solid, are brought together in highly diluted form, a very stable and dense cloud of high obscuring power is formed. Furthermore, when a chloride, such as silicon or titanium tetrachloride is diluted with a large volume of moist air and then brought into contact with ammonia gas, a very dense, permanent cloud is formed.

A satisfactory smoke cloud requires, in the first place, density, i. e., a relatively thin layer of smoke must completely obscure any object behind it. In the second place, the cloud must be stable, i. e., it must not dissipate itself on standing or dilution nor must it settle out. Third, the cloud must be easily produced without complicated apparatus or difficulties of manipulation. Also the materials required for producing the cloud must be readily available, preferably cheap, easily transported and not dangerous to handle.

By a series of experiments, the following conditions have been determined best adapted for the production of permanent smoke clouds:

1. Only gases or substances capable of vaporization can be employed.

2. The substances from which the smoke is to be produced should be brought into the gaseous or vapor state before reacting to form the cloud.

3. The gases or vapors should be diluted with some inert gas, preferably air, before interaction. The degree of dilution essential for the best results must be determined for each specific gas. It has, however, been found in all cases to be very high.

4. The reaction products of which the smoke particles consist should preferably be:

(*a*) Solid—otherwise, the particles will tend to grow in the presence of an excess of either of the components which by chance may be present.

(*b*) Non-volatile—otherwise, the particles will tend to disappear by evaporation as the cloud becomes diluted by air currents and larger particles will tend to grow at the expense of smaller ones.

(*c*) Inactive—especially towards water; otherwise, the particles will tend to grow by condensation of water into them, especially in humid atmosphere.

The reacting substances from which the smoke is to be produced should, if possible, be condensed gases having low heat or vaporization. Such liquids will tend to vaporize readily upon relief of pressure and maintain a constant pressure until their evaporation is complete. In this respect, they possess a great advantage over compressed gases, the pressure of which decreases constantly upon use.

Any cloud fulfilling these requirements must be made up of extremely small particles of liquid or solid, dispersed in the air. The individual particles must be large enough to disperse or diffuse light, but otherwise the smaller the particles the greater the obscuring power and the more stable the cloud, for a given concentration of cloud in air. The diffusing power of a given particle is probably not greatly influenced by its size if the particle is large enough to diffuse light at all. The problem of cloud formation, therefore, reduces itself to the problem of producing a suspension of extremely small particles of cloud-forming substance in air.

It is well known that when ammonia gas comes in contact with hydrochloric acid gas, a cloud of ammonium chloride is formed, the cloud having a rather poor obscuring power. From experience with ammonium chloride it was felt that this must be due to a formation of the fume under unsatisfactory conditions and, therefore, experimental investigation of the optical properties of ammonium chloride clouds, as determined by the conditions under which they are formed, was undertaken.

The obscuring power of a smoke was measured by determining the distance in feet beyond which it was impossible to see the filament of a standard electric light bulb. The density of clouds formed by adding a mixture of hydrochloric acid and ammonium gases, each diluted to an equal degree with air, was first determined. The maximum density of the cloud occurs when a volume of air about 60 times that of the reacting gases is used. The density is measured by the reciprocal of the number of feet thickness necessary to completely obscure the light filament. A cloud formed by ammonia and hydrochloric acid diluted sixty fold with air is many times as dense as a cloud formed by interaction between the undiluted gases. The efficiency of the cloud is therefore much greater and it is only possible to secure the production of a satisfactory cloud from these two gases by diluting them before this interaction.

This matter of cloud density is, however, only one of the factors of obscuring power. It is obvious that a layer of two feet thickness of a given cloud will have more obscuring power—probably twice the obscuring power—which a layer of 1 foot thickness would have. In other words, a total obscuring power (T. O. P.) of a cloud is measured by its cloud density times its volume. This product of cloud density in reciprocal feet times its volume in cubic feet is therefore the measure of the effectiveness of a cloud. The total obscuring power does not go through a maximum in this case but approaches a limiting value which increases but slightly after 100 volumes of air have been used for dilution. To secure the optimum results from an ammonium chloride cloud, at least this volume of diluent air must be employed.

The experiments above set forth were made by interaction of hydrochloric acid and ammonia both of which were diluted with equal volumes of air. In order to determine the effect of dilution of one of these gases over that of the other, a series of clouds were made, using in all cases the same total amount of air as diluent but varying the proportions in which the air was distributed between the ammonia and the hydrochloric acid. The density curve was found to go through a distinct maximum when both gases are diluted, indicating that dilution of both gases is better than dilution of one alone. On the other hand, the advantage gained by the dilution of both gases is not very great and if the dilution of one alone is much simpler, it may be advisable to sacrifice the small advantage of increase in density by diluting both gases.

The following combinations of smoke producing substances have been found to give fairly satisfactory results: $SO_2+NH_3$; $SnCl_4+NH_3$; $SnCl_4+NH_3+H_2O$; $PCl_3+NH_3+H_2O$; $Cl_2+NH_3$; $SiCl_4+NH_3$; $SiCl_4+NH_3+H_2O$; $TiCl_4+NH_3+H_2O$; $SO_2Cl_2$; $P+O_2$, $TiCl_4+H_2O$. Of these the cloud produced by interaction of $SiCl_4+NH_3+H_2O$ most nearly fulfils the conditions which have been found best suited for the production of clouds.

When moist air and $NH_3$ mix with $SiCl_4$ at the same time, a part of the $SiCl_4$ combines with the $NH_3$ directly, and part hydrolizes in the moist air, and the resultant HCl combines with the $NH_3$. Since the $SiCl_4.6NH_3$ particles formed are known to have less T. O. P. per pound than $NH_4Cl$ particles, it is obviously best to encourage the formation of the latter. In order to bring this about, two runs were made in one of which the $NH_3$ and the moist air came into the reaction chamber together and in the other the moist air alone came into the reaction chamber with the $SiCl_4$ and the $NH_3$ was put into the mixing chamber farther below. This latter method gave the best results, and although it would be expected that when hydrolysis took place in this way, $1SiCl_4$ would require but $4NH_3$, it was found that $5NH_3$ gave slightly better results in practice, probably due to the formation even under these conditions of some $SiCl_4.6NH_3$.

The fact that the T. O. P. is very high, the curve flat, the tip distance (the distance between the nozzles emitting the reacting substance) and other details quite unimportant, make this the most desirable smoke thus far produced. While $SiCl_4$ is a liquid and hence undesirable in some ways, its high volatility (B. P. 57° C.), the absence of corrosive properties, or any great tendency to gum up with moist air, are all points in its favor. It can be placed in steam-jacketed steel tanks and used as a gas, or forced out by the pressure of some liquified gas, such as $CO_2$, in the same cylinder.

Titanium tetrachloride has also been found to produce a good cloud, but the liquid $TiCl_4$ clogs more readily and the tip distance is important, whereas with $SiCl_4$ the tip distance is unimportant. The boiling point of $TiCl_4$ is about 130° C., which is much higher than that of $SiCl_4$, and hence its vaporization is more difficult. It is also more expensive and usually more difficult to obtain. While this invention has been described as applied to the production of smoke clouds, it is not intended that it be limited to the same since the method herein disclosed is readily applicable to various industrial applications such as the preparation of pigments, and many other materials wherein a fine state of subdivision is described.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. In a method of producing finely divided materials, diluting all the components with an inert gaseous substance and mixing.

2. In a method of producing finely divided materials, diluting the components with moist inert gaseous substance and then mixing.

3. In a method of producing finely divided materials, diluting the components with moist air and then mixing.

4. In a method of producing finely divided materials, diluting one of the components to a high degree with an inert gaseous substance and then mixing.

5. In a method of producing finely divided materials, diluting the components to a high degree with an inert gaseous substance and then mixing.

6. In a method of producing finely divided materials, diluting the components to a high degree with air and then mixing.

7. In a method of producing finely divided materials, diluting the components to a high degree with moist inert gaseous substance and then mixing.

8. In a method of producing finely divided materials, diluting the components to a high degree with moist air and then mixing.

9. In a method of producing finely divided materials, mixing a chloride of an element of the fourth group of the periodic table, whose atomic weight is 25–100, with ammonia.

10. In a method of producing finely divided materials, mixing a chloride of an element of the fourth group of the periodic table, whose atomic weight is 25–100, with a large volume of moist air and then with ammonia.

11. A process comprising volatilizing a chloride, diluting same with a large volume of an inert gaseous substance and then treating the resulting mixture with a substance capable of reacting therewith to produce finely divided material possessing high stability and permanency.

12. A process comprising volatilizing a chloride, diluting same with a large volume of an inert gaseous substance and then treating the resulting mixture with ammonia.

13. A process comprising volatilizing a chloride of an element of the fourth group of the periodic table having an atomic weight 25–100, diluting same with a large volume of an inert gaseous substance and then treating the resulting mixture with a substance capable of reacting therewith to produce finely divided material possessing high stability and permanency.

14. A process comprising volatilizing a chloride of an element of the fourth group of the periodic table having an atomic weight 25–100, diluting same with a large volume of an inert gaseous substance and then treating the resulting mixture with ammonia.

15. A process comprising volatilizing a chloride of an element of the fourth group of the periodic table having an atomic weight 25–100, diluting same with a large volume of moist air and then treating the resulting mixture with a substance capable of reacting therewith to produce finely divided material possessing high stability and permanency.

16. A process comprising volatilizing a chloride of an element of the fourth group of the periodic table having an atomic weight 25–100, diluting same with at least 100 times its volume of air and then mixing same with ammonia.

17. A process comprising volatilizing a chloride of an element of the fourth group of the periodic table having an atomic weight 25–100, diluting same with at least 100 times its volume of moist air and then mixing same with ammonia.

18. In a method of producing finely divided materials, mixing $SiCl_4$ with ammonia.

19. In a method of producing finely divided materials, diluting $SiCl_4$ with air and then mixing with ammonia.

20. In a method of producing finely divided materials, diluting $SiCl_4$ with moist air and then mixing with ammonia.

21. In a method of producing finely divided materials, diluting $SiCl_4$ with a large volume of moist air and then mixing with ammonia.

22. In a method of producing finely divided materials, diluting $SiCl_4$ with at least 100 times its volume of moist air and mixing same with ammonia.

23. In a method of producing a cloud, mixing a volatile chloride with ammonia, at least one of said substances being previously highly diluted with air.

24. A cloud comprising the reaction products of ammonia and a chloride of an element of the fourth group of the periodic table having an atomic weight less than 100.

25. A cloud comprising the reaction products of ammonia and a chloride of an element of the fourth group of the periodic table having an atomic weight 25–100 and highly dispersed in inert gaseous substance.

26. A cloud having great stability, high density, low rate of settling and high total obscuring power and comprising the reaction products of ammonia and a chloride of an element of the fourth group of the periodic table having an atomic weight 25–100 and highly dispersed in air.

27. A cloud comprising the reaction products of ammonia and a chloride of an element of the fourth group of the periodic table having an atomic weight of 25–100 and highly dispersed in moist air.

28. A cloud having great stability, high density, low rate of settling and high total obscuring power and containing very finely divided particles comprising the reaction products of silicon tetrachloride and ammonia.

29. A cloud containing very finely divided particles comprising the reaction products of ammonia and silicon tetrachloride highly diluted with moist air.

30. Finely divided material comprising the reaction products of components, all of said components being dispersed with inert gaseous material before reaction.

31. Finely divided material comprising the reaction products of components, some of said components being highly dispersed with inert gaseous material before reaction.

32. Finely divided material comprising the reaction products of components, all of said components being highly dispersed with inert gaseous material before reaction.

33. Finely divided material comprising the reaction products of components, all of said components being dispersed with air before reaction.

34. Finely divided material comprising the reaction products of components, some of said components being highly dispersed with air before reaction.

35. Finely divided material comprising the reaction products of components, all of said components being highly dispersed with air before reaction.

WARREN K. LEWIS.
ROBERT E. WILSON.

Certificate of Correction.

It is hereby certified that in Letters Patent No. 1,433,732, granted October 31, 1922, upon the application of Warren K. Lewis and Robert E. Wilson, of Cambridge, Massachusetts, for an improvement in "Production of Finely-Divided Materials," errors appear in the printed specification requiring correction as follows: Page 1, line 85, for the word "or" read *of;* page 2, line 15, for the word "ammonium" read *ammonia;* page 3, line 129, claim 24, for the words "less than 100" read *25–100;* and that the said Letters Patent should be read with these corrections therein that the same may conform to the record of the case in the Patent Office.

Signed and sealed this 9th day of January, A. D., 1923.

[SEAL.]

KARL FENNING,
*Acting Commissioner of Patents.*